Patented Oct. 10, 1939

2,176,037

UNITED STATES PATENT OFFICE 2,176,037

ANTIOXYGENIC COMPOSITION

Sidney Musher, New York, N. Y., assignor to Musher Foundation Incorporated, New York, N. Y., a corporation of New York No Drawing. Application March 11, 1939,
Serial No. 261,311

12 Claims. (Cl. 99—150)

This application relates to the preparation of new cereal flours having unusual and useful properties when employed as stabilizers or for ordinary purposes where the cereals are normally used.

An object of this invention is the production of substantially new cereal flours having unusual stabilizing properties, particularly when used for purposes for which cereal flours are normally employed.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, the water soluble, carbohydrate and phosphorus containing, fibre and starch free extract of a cereal flour is prepared and most desirably using maize or oats, and preferably maize that is finely divided, dry milled, and raw or unbleached. The cereal may be dehulled but for normal commercial manufacture, the hulls may be allowed to remain as part of the cereal. The raw and unbleached by-products from the normal milling of maize or oats may much less desirably be employed for extraction purposes.

The cereal that is used for extraction purposes, such as finely divided raw and unbleached dry milled maize, should be mixed or agitated thoroughly with a quantity of water for 10 seconds to 1 hour and preferably for about 30 minutes in order to obtain the maximum yield. The temperature of mixing should be at between 130° F. and 140° F., although slightly lower temperatures may also be employed. The water used should be substantially free of minerals and desirably free of iron and copper and should be slightly acid and preferably adjusted to a pH of 6 before extraction in order to obtain a clear supernatant liquid during settling and a more rapid settling out of the insoluble matter.

Any quantity of water may be used to produce a free flowing mixture. For example, 1 part of maize should preferably be mixed with 9 parts of water by weight. Other proportions may also be used such as from 6 to 15 parts of water to every 1 part of maize.

The maize water suspension should then be subjected to thorough agitation, preferably for a period of about 30 minutes. It is desirable for the temperature of the water at the time of extraction to be about 135° F. It is not desirable for the extraction to be conducted at above 135° F. because of gelatinization of the starch present in the cereal at more elevated temperatures. Where the maize water suspension is allowed to stand for settling out, and after the 30 minute agitation and extraction period the solution should desirably be cooled by placing it in a jacketed or coiled vat or by running water through cooling coils immersed therein or by adding cold water to the hot maize water suspension so that the temperature of the water is reduced to from 80° F. to 105° F., and preferably to about 100° F. in order to avoid fermentation during the settling period.

The solution thus cooled may then be treated to remove the undissolved starch, fibrous and other cereal portions. This may be accomplished by allowing the agitated mixture to settle for 2 to 12 hours or more until a substantially clear unfermented supernatant liquor is formed which liquor is removed by decanting, siphoning or similar process.

The maize solution may also be subjected to a continuous centrifuging operation whereby all undissolved material is removed as a continuous operation.

The clear solution thus obtained should desirably be evaporated by vacuum distillation at 135° F. under 25 inches of vacuum, to approximately 25% to 75% solids and desirably to about 50% solids and to a Baumé of 24°. After the proper solids content has been reached, the extract should desirably be subjected to superheated steam in the vacuum pan in order to raise the temperature of the extract to 200° F. for about 10 minutes in order to sterilize it and also retain its full stabilizing properties for longer periods.

The evaporating temperature may vary, dependent upon whether vacuum or atmospheric pressure is used. Although it is desirable to use vacuum evaporation, evaporation at atmospheric pressure may also be employed.

The concentrated extract may be packed in cans or other containers and sterilized at 220° F. to 250° F. for 10 to 30 minutes.

Where, due to prolonged sterilization or high heat during such sterilization, a coagulation or precipitation is formed resulting in the production of insoluble matter, such precipitate may be filtered or otherwise removed. Distilled or softened water is desirable as the extracting medium and will avoid, to a large degree, such precipitation and coagulation.

This water extract of finely divided, dry milled, raw and unbleached maize at a Baumé of 20° and even up to a Baumé of 40° containing from 30% to 60% total solids is a light colored, bland, substantially odorless and flavorless, free flowing material, such material containing both carbohydrates and phosphatides in water soluble form and such material capable of being used for addition to many products subject to oxidation without changing the normal characteristics of the product with which it is used. The extract is also starch, fibre and oil free.

The water extract of whole pulverized oats is of dark brown or tan color, comparatively solid at 75° F. and liquid at 125° F. flowing freely at that temperature, but such extract having a much more pronounced odor and flavor than the maize extract.

It is not desirable to dry down in excess of 70% solids in the vacuum pan, so as to avoid darkening and caramelization of the extract.

Where drying is desirable, the concentrated water extract may be dried on trays, preferably under vacuum and a desirable dried product will be obtained. Drum drying is difficult in view of the mucilaginous nature of the extract by means of which the extract adheres to the drum and cannot readily be scraped off. Spray drying may less preferably be resorted to in view of the oxidation occurring during the spray drying operation.

Where desired, a carrier may be employed in the drying of the concentrate. For example, the concentrated water extract may be mixed with condensed skim milk on the basis of using from 10% to 60% by weight of the extract (on its solids basis) against the solids weight of the skim milk and the thoroughly mixed combination of the concentrate and skim milk dried on a drum drier or otherwise dried. The skim milk absorbs the gummy characteristics of the concentrate and permits much easier drying than where the concentrate is dried alone. Other carriers may also be employed such as salt and sugar, for example, dependent upon the use to which the extract is eventually to be put.

It is more desirable for purposes of extraction to use either a dry milled maize product as the cereal for extraction although oats may also be used. Maize and oats will give an extract of substantially greater potency than the other cereals and the yield obtained will also be greater. In the case of oats, it is preferable to use finely divided whole oats with its full content of oat groats and hulls rather than oat flour. There may also less desirably be utilized the oat middlings and hulls or other residuary products obtained during the milling of the oats.

The yield which is obtained, which is an important consideration, will average between 8% and 11% on the solids basis provided the extraction of the maize-water is carried out at a temperature of about 135° F. for approximately 30 minutes, during which time the maize is agitated in the water suspension. Where the temperature of the water is dropped to below 130° F., the yield will very materially be decreased, dropping as low as 3% to 6% on the solids basis. At the same time the water temperature should not exceed 140° F. in order to avoid solubilization and gelatinization of the starch. Where solubilization occurs first, the yield will naturally be increased but the effectiveness of the extract will be decreased. Where gelatinization occurs, naturally, the supernatant water portion containing the water soluble extract cannot be readily removed and the yield will be materially lessened.

The supernatant water portion of a maize-water mixture is considerably clearer than that produced when the oat cereal is extracted, and particularly where clarity of the finished concentrate is desired, dry milled, finely divided, raw maize should be employed in preference to oats.

The dried or concentrated water extract that is thus obtained is used in a minor proportion and desirably to the extent of less than 25% for addition to cereals and preferably for addition to oat or maize cereals.

For example, the concentrated water extract of finely divided whole oats containing 40% total solids may be mixed with an equal weight of oat flour until a thoroughly homogeneous product is obtained. Preferably the mixing is done at room temperature although slightly elevated temperatures may be used as 120° F. Where desired, the water extract may be sprayed on a moving belt carrying oat flour. The extract may be thoroughly intermixed with the oat flour in other manners also. Additional oat flour may then be added and thoroughly admixed until the desired proportion is attained. The fortified and stabilizing cereal flour thus produced may then be dried to reduce the total moisture content to about 12% or less which may be done by passing the flour over heated baffles or plates to promote evaporation of excess water, or otherwise dried.

Where as little as 2% to 5% of the concentrated extract is added to oat or maize flour, the flour may be dried before treatment with the extract so that its moisture content is sub-normal or a flour of particularly low moisture content may be used so that when the small amount of the extract is added, no further drying need be necessary.

The flour obtained by treatment with the water extract, particularly of oats or maize, is extremely stable and resistant to oxidation and rancidity. Normally, such cereal flours as maize meal (corn meal), whole wheat flour, oat meal, and similar cereals are subject to development of off flavors, and particularly when stored at humid or accelerated temperatures. This is particularly true of the whole cereals with their normal germ content such as of oats, whole wheat, wheat germ, rice bran, etc., and also of degerminated cereals as of corn meal, degerminated wheat flour, etc.

Example I

Yellow degerminated unbleached maize or corn meal normally containing about 11% moisture was admixed with 5.0% of the concentrated water extract of finely divided yellow degerminated unbleached raw maize flour having a solids content of 40% which was dried under vacuum at 135° F. and then heated to 200° F. for 10 minutes to sterilize it. The flour was then dried by passing over hot plates at 125° F. until the moisture content was reduced to about 11% as normal. The flour thus obtained was compared with the original maize flour by storing at 110° F. in an open tray exposed in the incubator.

An off odor in the untreated corn meal developed within 40 days and rancidity within 48 days, where as no rancidity developed within 90 days (the duration of the experiment) in the treated corn product.

Example II

To raw oat flour was added 2 p. p. m. of $CuSO_4$ and 1% of salt. In one case, the oat flour thus prepared was treated by spraying thereon 8% of the concentrated water extract of finely divided raw unbleached whole oats having a solids content of 45% and which was prepared by vacuum evaporation at 130° F., and then superheated at 200° F. for 5 minutes in the vacuum pan. The treated flour was mixed thoroughly, dried at 125° F. and was tested along with untreated flour as in Example I. An off odor in the untreated oat flour developed within 63 days and became very bad within 68 days whereas the treated sample retained its original odor for 90 days (the duration of the experiment).

The water extracts of maize and oats when prepared as described are substantially free of the pro-oxidants normally present in the original cereal. Other extracts such as the hexane extract, are not effective to the same degree as the water soluble extract and, in addition, are extremely difficult to use because of the oily and objectionable nature of such extracts.

Example III

The water extract of finely divided dry milled maize was prepared as in Example II and incorporated to the extent of 4% in various cereal flours, using the procedure outlined in Example II and also incorporating 3 p. p. m. of $CuSO_4$ and 1% of salt to accelerate decomposition. Another lot of the same flours treated with $CuSO_4$ and salt was prepared by incorporating 4% of the hexane extract of the maize, the extract being oily in character and rendering the flours greasy and rather objectionable in appearance. The various flours were made up into an aqueous candy filling with sugar, water, cocoanut oil and vanilla, and then placed at 110° F. for observation as to odor and flavor.

|  | Observations after— | | |
|---|---|---|---|
|  | 10 days | 20 days | 30 days |
| Raw whole wheat flour untreated. | Off odor | Rancid | Rancid. |
| Raw whole wheat flour containing hexane extract. | Good | Off odor | Do. |
| Raw whole wheat flour containing water extract. | do | Good | Slightly off. |
| Bleached wheat flour untreated. | Off odor | Rancid | Rancid. |
| Bleached wheat flour containing hexane extract. | Good | do | Do. |
| Bleached wheat flour containing water extract. | do | Slightly off odor. | Off odor. |
| Bleached rye flour untreated. | Off odor | Rancid | Rancid. |
| Bleached rye flour containing hexane extract. | Good | do | Do. |
| Bleached rye flour containing water extract. | do | Good | Off odor. |

The fortified flours thus obtained are particularly valuable when used for stabilizing other products normally subject to deterioration with which they may be used. For example, oat flour fortified with 10% of the water extract of whole ground oats may be utilized for dusting over potato chips and nuts by admixture with salt, in the manufacture of ice cream, butter or other dairy products, in the curing of bacon, fish, poultry or other animal product, for addition to sausage, hamburger, frozen pork trimmings, etc., to retard both rancidity and blood oxidation of haemoglobin, as a sizing on paper or board used for the wrapping of fatty foods, such as lard, butter, bacon, whole wheat biscuits, etc., as a sizing on textiles, for use in desserts, candies, pie crust or doughnut mixes, for whole wheat biscuits, for use in animal feeds, poultry feeds containing oxidizable vitamins, etc., and for other purposes where stabilization against oxidation is desired. Cereal grasses such as alfalfa may also be treated in this manner by incorporating therein relatively small amounts of the concentrated extract of maize or oats in order to stabilize the carotene contained therein, and particularly where the alfalfa or other cereal grass is dried at a comparatively high heat.

Example IV

The water extract of raw unbleached finely divided whole oats was prepared by immersing 1 part by weight of oats in 9 parts of water adjusted to a pH of 6.0 mixing at 135° F. for 15 minutes, allowing to settle for 6 hours, removing the supernatant clear water portion by siphoning, superheating that supernatant portion to 200° F. by allowing it to pass through steam pipes, passing it into a vacuum pan and condensing to 50% solids at 140° F. under a vacuum of 25" thus obtaining a yield of 17.6% against the weight of the oats.

This extract was then thoroughly admixed with 20 times its weight of finely milled oat flour. The flour thus obtained was compared with the original untreated oat flour by splitting a mackerel to obtain two fillets, salting one fillet with an equal part by weight of salt containing 5% of the treated oat flour, and salting the other fillet in the same way with the untreated oat flour. The fillets were left at room temperature and observations weer made as follows:

|  | After— | |
|---|---|---|
|  | 1 month | 2 months |
| Fillet with untreated oat flour | Rancid | Very badly rancid |
| Fillet with treated oat flour | Slightly off | Slightly rancid. |

Example V

A No. 2 clear bleached wheat flour was prepared as in Example IV with 5% of the water extract of raw oats. The flour thus obtained was sized on vegetable parchment paper by passing the paper through a bath composed of 85% water and 15% of the treated flour at a temperature of 70° F., the paper retaining about 0.75% by weight of the flour. Similar paper sized with untreated flour was prepared in the same manner.

The papers were used for the wrapping of butter and the butter was scored at its surface at regular intervals after storage at 50° F. with the following observations.

|  | Surface score after— | | | |
|---|---|---|---|---|
|  | 0 weeks | 2 weeks | 6 weeks | 8 weeks |
| Butter wrapped with— | | | | |
| Treated flour parchment | 92.0 | 92.0 | 90.5 | 89.75 |
| Untreated flour parchment | 92.0 | 91.75 | 89.75 | 88.5 |

The fortifying of the cereal with the water extract increases very materially the total stabilizing value of the cereal.

Example VI

The water extract of finely divided oats prepared for Example IV was added in the amount of 10% to finely ground raw unbleached whole oats. Assuming that the water extract removed all the stabilizers from the oats, with a yield of 17.6% of water extract obtained, the 10% of extract would be the equivalent to about 57% of additional oats used.

In the curing of mackerel, following the procedure outlined in Example IV, there was used with each fillet, each weighing approximately 380 grams:

A. A mixture of 300 grams of salt and 60 grams of the finely divided oats and 6 grams of the water extract of oats as a combination referred to above.

B. A mixture of 300 grams of salt and 94.2 grams of finely divided oats, this being the expected equivalent to the extract and the oats used with A, assuming that all the stabilizing activity was removed with the extract.

The fillets were held at room temperature and observed at regular intervals with the following observations:

|  | After— | | |
|---|---|---|---|
|  | 1 month | 2 months | 3 months |
| Fillet packed in A | O. K. | Some rancidity | Rancid. |
| Fillet packed in B | Off | Rancid | Very badly rancid and putrid. |

The fortified cereal containing the water extract of oats or maize is particularly of value when it is used in a medium involving a heat treatment of 145° F. or over and preferably above 225° F. Under the conditions of subjecting the fortified cereal to a heat treatment in the presence of the material requiring stabilization, marked acceleration of inhibiting action is obtained.

Example VII

Unbleached whole wheat flour was mixed with 10% of the concentrated water extract of raw finely divided maize flour following the procedure outlined in Example IV by mixing the extract thoroughly with the flours and then drying at 130° F. for 4 hours. The fortified flour thus obtained was compared with unfortified flour by making into toasted shredded wheat type biscuits, after flavoring with salt. The biscuits were then stored in board containers at 98° F. for 3 months and regularly observed over this period.

|  | Observations after— | | |
|---|---|---|---|
|  | 1 month | 2 months | 3 months |
| Biscuits using fortified flour | O. K. | O. K. | Off. |
| Biscuits using unfortified flour | O. K. | Rancid | Rancid. |

Example VIII

The flours referred to above were added to cream contaminated with 4 p. p. m. of CuSO4 in an amount of 0.3% and the creams were then heated to 180° F. for 10 minutes. Both creams were then stored at 50° F. and tested for development of oxidized flavor at daily intervals, the number of + signs indicating the degree of oxidized flavor obtained.

Another lot of the same cream was prepared in which the fortified and unfortified flour was added to cream after the cream had been heated to 180° F. for 10 minutes in order to compare creams given identical treatment. In one case the creams were heated first and the flours added later, and in the other case, the flours were added before heating.

|  | Observations after— | | |
|---|---|---|---|
|  | 24 hours | 72 hours | 96 hours |
| Cream heated to 180° F. and then 0.3% of the above unfortified wheat flour added | + | +++ | ++++ |
| Cream containing 0.3% unfortified wheat flour and then heated to 180° F | + | +++ | +++ |
| Cream heated to 180° F. and then 0.3% of the above flour fortified with the maize extract added | — | + | ++ |
| Cream containing 0.3% of the above fortified flour and then heated to 180° F | — | — | — |

It is observed that the heat treatment of the fortified flour in the product requiring stabilization markedly accelerates the antioxidant properties of the flour.

Example IX

To 500 gram samples of milk containing 3 p. p. m. of CuSO4 was added

A. 1 gram of the finely divided oats and 0.1 gram of the oat extract used in Example VI.

B. 1.57 grams of the finely divided oats used in Example VI, this being the expected equivalent to the materials added in milk A.

The milks were then heated to 160° F. for 30 seconds and tested at 50° F. for oxidized flavor development.

|  | Observations after— | | |
|---|---|---|---|
|  | 24 hours | 48 hours | 72 hours |
| Milk A | — | ± | ++ |
| Milk B | ± | ++ | +++ |

In a similar manner, the fortified flour may be used in the manufacture of candies, cooked oat meal, whole wheat biscuits and similar products where heat treatments are subsequently applied in order to accelerate the stabilizing properties of the fortified flour.

The product being stabilized should be subjected to elevated temperatures after the fortified flour has been added to it and thoroughly dispersed therein. It is not desirable nor can the desired effect be obtained by heating the fortified flour and then adding such flour to the oxidizable material. When the fortified flour is heated alone, no improvement is obtained over the unheated flour and frequently a reduction in antioxygenic activity is observed.

In a similar manner to that described above where the antioxygenic flour was used for milk and cream before heating, it may similarly be utilized for addition to ice cream, condensed or evaporated milk, frozen cream, cream cheese, or other form of dairy product, fruit juice, etc., before subjecting to a heat treatment of from 145° F. to 250° F. or higher.

The fortified flour may also be used for addition to fruit concentrates, beverages, vegetable juices, liquid egg yolk, egg white, soups, tomato juice, tomato catsup, jams and jellies, desserts and similar products.

In the preparation of the water extract of oats or maize, where it is desirable to obtain a more rapid precipitation of the protein materials contained in colloidal suspension, there may be used a small amount of acid such as acetic acid, sulphurous acid, etc., in the water at the time of extraction. There may also be used small amounts of enzyme material for the purpose of obtaining further clarification of the extract, which addition should desirably be made at the time of the extraction.

The residue obtained after removal of the extract may be dried by heating under vacuum to 125° F. or by passing over hot plates or other means. After drying, the residue has excellent value for animal feed or for use in the manufacture of starch or for other purposes where the water soluble portion removed as an extract would not be a requisite. For example, the residue that is obtained following the extraction of maize may be used directly in the manufacture of corn starch and by this means a large amount of the objectionable wash water which is accumulated in the normal manufacture of corn starch would be avoided by first removing the water extract according to this process. At the same time the residue will have as great if not greater value for the production of starch because to the extent that the extract has been removed from the original cereal, the total starch content will have been increased.

Where it is not desired to use the residue for feed purposes, a filter aid such as bone black, fuller's earth, etc. may be employed and the water containing the extract may be filtered from the residue by the use of such filter aid. It is difficult to filter the residue because of the caking of the residue on the filter press.

Modification may be made in the use of water as a solvent as when minor proportions of other water soluble solvents are employed together with water in the extraction of the cereal. For example, there may be employed ethyl alcohol, acetone, glycerol, and other similar water miscible organic solvents together with water for the extraction of the oats or maize.

The cereals referred to may be preferably subjected to a degerminating process whereby the germ is removed by means of dry milling or less preferably the cereals may be utilized with the normal germ present. In addition, for purposes of this invention, the germs themselves may be employed, preferably in finely divided, raw and unbleached form and as obtained by a dry milling process. The water extract of corn germ is one of the less preferable products to be employed for purposes of water extraction, and still less preferably wheat germ may be used.

Although other solvents such as hexane may be used for the extraction of cereals, for example, no solvent other than water or a water miscible solvent yields an extract so markedly effective as a stabilizer for aqueous materials and so devoid of the pro-oxygenic substances frequently present in the extracted materials.

In a less preferred alternative, in addition to fortifying the cereal flours by the use of the water extract of an oat or maize product in the manner referred to above, it is possible to replace some or all of the maize, oat or other cereal flour with such other flours as soya flour, peanut flour and other flours made from the oil containing seeds or de-oiled residues, thereby reducing materially the susceptibility of the seed flour to oxidative deterioration. The finely divided germs may similarly be fortified such as corn germ and wheat germ, particularly by the concentrated water extract of oats or degerminated corn.

It is important that the first extract be utilized and it is the first extract that is referred to by the term "extract" in the specification and claims since this extract contains the antioxygenic values. It is not possible to obtain satisfactory extracts by using bleached flours, or flours that have been subjected to chemical change whereby their insoluble proteins have been substantially converted to soluble proteins.

The concentrated water extract of oats and maize as described may also be used for addition to the pure starches such as to corn starch, tapioca starch, etc., in order to fortify those starches with antioxidant properties wherein such flours may more satisfactorily be used not only for the purposes for which they are normally employed, but also more desirably used for those and other purposes in view of their antioxidant properties.

For example, from 5% to 20% by weight of the substantially odorless and flavorless concentrated or dried water extract of raw unbleached dry milled maize flour may be added to corn starch and thoroughly mixed and dispersed throughout the starch, subjecting the starch to a final drying operation in order to remove any moisture that might have been added along with the concentrated water extract and such starch may be used to a definite advantage as a sizing on paper, board, textiles, or for similar sizing operations, and also for use in the manufacture of puddings and desserts in order to very substantially retard oxidative deterioration of the product with which such treated starch in used or with which such fortified starch would come into contact.

For all of these purposes the concentrated or dried water extract of maize is the most satisfactory product in view of its bland and odorless characteristics whereby there is substantially no change made in the normal appearance or characteristic of the treated cereal.

Having described my invention, what I claim is:

1. An antioxygenic composition consisting of a major proportion of a material selected from the group consisting of the cereals and seeds and a minor proportion of an extract of a finely divided unbleached cereal, said extract being selected from the group consisting of the water soluble and alcohol soluble extracts and said extract being intimately combined with said material.

2. An antioxygenic cereal composition comprising a finely divided cereal as a base, said cereal being intimately incorporated with and carrying a minor proportion of an extract of finely divided unbleached cereals, said extract being soluble in a solvent selected from the group consisting of water and alcohol.

3. An antioxygenic composition comprising a finely divided cereal as a base, said cereal being intimately incorporated with and carrying a water soluble extract of finely divided unbleached cereals.

4. An antioxygenic composition consisting of a major proportion of a finely divided seed and a minor proportion of an extract of finely divided unbleached cereals, said extract being soluble in a solvent selected from the group consisting of water and alcohol and said extract being intimately combined with said finely divided seed.

5. A process of preparing an antioxygenic mixture, said process comprising mixing a finely divided unbleached cereal in a relatively large volume of a solvent selected from the group consisting of water and alcohol, removing the undissolved starch and fibrous cereal residues, concentrating the solution and combining said concentrated solution with a relatively large quantity of a material selected from the group consisting of the cereals and seeds.

6. A process of preparing an antioxygenic mixture comprising a finely divided unbleached cereal in a relatively large volume of a solvent selected from the group consisting of water and alcohol, removing the cereal residues, concentrating the resultant solution, mixing the concentrated solution with a cereal flour and then drying.

7. A stabilized organic composition containing an antioxygenic composition consisting of a major proportion of a material selected from the group consisting of the cereals and seeds and a minor proportion of an extract of unbleached finely divided cereals, said extract being intimately combined with said material, said extract being soluble in a solvent selected from the group consisting of water and alcohol.

8. A process of substantially stabilizing an organic composition susceptible to oxidation which comprises forming a combination of a major proportion of a material selected from the group consisting of the cereals and seeds and a minor proportion of an extract of unbleached finely divided cereals, said extract being intimately combined with said material, said extract having been obtained by the use of a solvent selected from the group consisting of water and alcohol, followed by removal of the insoluble cereal residues and then mixing the combination with the organic composition susceptible to oxidation.

9. An antioxygenic composition consisting of a major proportion of a material selected from the group consisting of the cereals and seeds and a minor proportion of an extract of an unbleached antioxygenic cereal product, said extract being selected from the group consisting of the acidified water soluble and alcohol soluble extracts and said extract being intimately combined with said material.

10. A stabilized organic composition containing an antioxygenic composition consisting of a major proportion of a material selected from the group consisting of the cereals and seeds and a minor proportion of an extract of an unbleached antioxygenic cereal product, said extract being intimately combined with said material, said extract selected from the group consisting of the acidified water and alcohol soluble extracts.

11. A stabilized food composition containing an antioxygenic composition consisting of a major proportion of a material selected from the group consisting of the cereals and seeds and a minor proportion of an extract of an unbleached antioxygenic cereal product, said extract being intimately combined with said material, said extract being soluble in a solvent selected from the group consisting of acidified water and alcohol.

12. An antioxygenic composition consisting of a major proportion of a material selected from the group consisting of the cereals and seeds and a minor proportion of an acidified water soluble extract of unbleached antioxygenic maize, said extract being intimately combined with said material.

SIDNEY MUSHER.